United States Patent
Choi et al.

(10) Patent No.: US 9,088,873 B2
(45) Date of Patent: Jul. 21, 2015

(54) METHOD FOR ALLOCATING GROUP ADDRESS IN WIRELESS LOCAL NETWORK AREA, METHOD FOR TRANSMITTING RESPONSE REQUEST FRAME AND RESPONSE FRAME IN PLURALITY OF STATIONS, AND METHOD FOR TRANSMITTING DATA USING GROUP ADDRESS

(75) Inventors: Jeeyon Choi, Daejeon (KR); Yun-Joo Kim, Suwon-si (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 37 days.

(21) Appl. No.: 13/502,997

(22) PCT Filed: Oct. 20, 2010

(86) PCT No.: PCT/KR2010/007183
§ 371 (c)(1), (2), (4) Date: Apr. 19, 2012

(87) PCT Pub. No.: WO2011/049360
PCT Pub. Date: Apr. 28, 2011

(65) Prior Publication Data
US 2012/0213184 A1 Aug. 23, 2012

(30) Foreign Application Priority Data
Oct. 20, 2009 (KR) .................. 10-2009-0099726

(51) Int. Cl.
*H04W 4/08* (2009.01)
*H04W 8/18* (2009.01)
*H04W 8/26* (2009.01)

(52) U.S. Cl.
CPC ............... *H04W 4/08* (2013.01); *H04W 8/186* (2013.01); *H04W 8/26* (2013.01)

(58) Field of Classification Search
CPC .......... H04W 4/08; H04W 8/186; H04W 8/26
USPC ......................................... 370/312, 320–338
See application file for complete search history.

(56) References Cited

U.S. PATENT DOCUMENTS

| 8,254,309 B2 | 8/2012 | Matsue et al. |
| 2006/0252443 A1 | 11/2006 | Sammour et al. |

(Continued)

FOREIGN PATENT DOCUMENTS

| CN | 101395835 A | 3/2009 |
| CN | 101461181 A | 6/2009 |

(Continued)

OTHER PUBLICATIONS

International Seach Report for PCT/KR2010/007183 filed on Oct. 20, 2010.

(Continued)

*Primary Examiner* — Xavier S. Wong

(57) ABSTRACT

The present invention relates to a method for allocating a group address in a wireless LAN, a method for transmitting a response request frame and a response frame to a plurality of terminals, and a data transmission method using the same group address. The method for allocating the group address of the present invention comprises the steps of: transmitting a group agreement request frame including the group address (identifier) to terminals as grouping targets; and receiving a response frame corresponding to the group agreement request frame. The group agreement request frame includes group address (identifier) information and a terminal address as a destination address and is transmitted to a receiving terminal as a destination.

15 Claims, 9 Drawing Sheets

(56) References Cited

U.S. PATENT DOCUMENTS

| | | |
|---|---|---|
| 2009/0046613 A1* | 2/2009 | Gaur ............................ 370/312 |
| 2009/0147719 A1 | 6/2009 | Kang |
| 2009/0296658 A1* | 12/2009 | Calhoun et al. ............... 370/331 |

FOREIGN PATENT DOCUMENTS

| | | |
|---|---|---|
| EP | 1 713 208 A2 | 10/2006 |
| JP | 61-099439 A | 5/1986 |
| JP | 11-331254 A | 11/1999 |
| JP | 2008-160182 A | 7/2008 |
| KR | 10-2009-0059786 A | 6/2009 |
| WO | WO 2007/052143 A2 | 5/2007 |
| WO | WO 2007/099436 A2 | 9/2007 |
| WO | WO 2007/122503 A2 | 11/2007 |

OTHER PUBLICATIONS

Written Opinion for PCT/KR2010/007183 filed on Oct. 20, 2010.

* cited by examiner

| Frame control information | Medium occupancy time | Receiving station address | Transmission station address | Sequence control information | QoS control information | Frame body | FCS |

FIG. 3

| Frame control information | Medium occupancy time | Receiving station address | Transmission station address | Sequence control information | QoS control information | Multi-receiving station information | Frame body | FCS |

FIG. 4

| Multi receiving station number (n) | Multi receiving station address 1 | Multi receiving station address 2 | ... | Multi receiving station address n |

FIG. 7

| Multi receiving station number (n) | Multi receiving station address 1 | Multi response time 1 | Multi receiving station address 2 | Multi response time 1 | . . . | Multi receiving station address n | Multi response time n |
| --- | --- | --- | --- | --- | --- | --- | --- |

METHOD FOR ALLOCATING GROUP ADDRESS IN WIRELESS LOCAL NETWORK AREA, METHOD FOR TRANSMITTING RESPONSE REQUEST FRAME AND RESPONSE FRAME IN PLURALITY OF STATIONS, AND METHOD FOR TRANSMITTING DATA USING GROUP ADDRESS

TECHNICAL FIELD

Exemplary embodiments of the present invention relate to a method for allocating a group address in a wireless local area network (WLAN), a method for transmitting a response request frame and a response frame at a plurality of stations, and a method for transmitting data using the group address (or identifier); and, more particularly, to a method for allocating a group address for designating a plurality of stations as a predetermined group in a WLAN system, a method for transmitting a response request frame to a plurality of wireless stations and transmitting a response frame at a plurality of wireless stations, and a method for transmitting data using the group address (or identifier).

BACKGROUND ART

A wireless local network area (WLAN) supports an access point (AP) of a distributed system (DS) and a basic service set (BBS) formed of a plurality of stations (STA) which are not an access point (AP).

The access point (AP) can communicate with a new protocol wireless station and a legacy protocol wireless station. The access point (AP) may be defined as another terms such as a base station (BS), a node B, or a sector. The access point (AP) may access an Ethernet hub or a switching board. The Ethernet hub may access a router that transmits data packets to a MODEM.

There are wireless stations (STAs) in a coverage area of one access point. Such a wireless station (STA) is a final user access device in a WLAN system. That is, a wireless station (STA) is a transceiver that converts wireless signals to digital signals routable to communication devices and accesses to access points that receive data packets and distributes the received data packets to other devices or networks. Such a wireless station may be embodied in various forms such as universal serial bus (USB), a personal computer memory card international association (PCMCIA) card, a USB dongle, a network interface card (NIC) adaptor connected to a device, and an integral wireless module. Hereinafter, an access point (AP) and a wireless station (STA) are referred as a station.

IEEE 802.11 defines a protocol standard related to a wireless local area network (WLAN). A medium access control (MAC) protocol defined in IEEE 802.11 uses a frame structure shown in FIG. 1 in order to exchange information between wireless stations.

Referring to FIG. 1, a typical MAC frame structure includes a frame control information field, a medium occupancy time information field, a receiving station address field, a transmission station address field, a sequence control information field, a QoS control information field, a frame body field, and a frame check sequence (FCS) field.

The frame control information field includes a protocol field for recording a protocol version such as IEEE 802.11 MAC version, a type and subtype field for identifying a type of a frame in use, and additional fields for storing various parameters to control a frame, such as a ToDS field, a FromDS field, an additional fragment field, a retry field, a power control field, an additional data field, a WEP field, and a sequence field.

The medium occupancy time information field is used as one of a frame for network allocation vector (NAV) setup, a frame transmitted during a contention free period (CFP), and a PS-inspection frame.

The sequence control information field is used to dump a fragmentation/reassemble frame or an overlapped frame. The sequence control information includes a 4-bits fragmentation number field and a 12-bit sequence number field.

The frame body field is a typical data field. The frame body field includes a payload. A frame check sequence (FCS) is used for integrity check of a frame received from a predetermined station.

As described above, a MAC frame essentially includes the frame control information field, the medium occupancy time information field, a receiving address (RA) field, and a frame check sequence (FCS) field. The other fields may be excluded or included according to a type of a frame for saving wireless resources. For example, a QoS control information field may be excluded in case of a data frame not using QoS. In case of an IEEE 802.11n dedicated frame, a high throughput (HT) control information field is additionally included for a HT function as well as the QoS field.

Some types of frames used in a WLAN require a response from a station receiving the frame. For example, frames that require a response are a request to send (RTS) frame, a block ACK request (BAR) frame, a data frame, and various request frames such as a Probe request frame, an Authentication request frame, and an Association request frame. Response frames for the response request frames are a clear to send (CTS) frame for the RTS frame, a block ACK (BA) frame for the BAR frame, an ACK or BA frame for the data frame, and a Probe response frame, an Authentication response frame, and an Association response frame for other request frames.

According to IEEE 802.11, a response frame for a response request frame is transmitted right after a short inter frame space (SIFS). Referring to FIG. 2, it is required to send a CTS frame for a RTS frame, an ACK frame for a data frame, a BA frame for a BAR frame, a BA frame for an Aggregated data frame after a short time interval such as SIFS after receiving corresponding response request frames.

Lately, users for a WLAN have been abruptly increased. There have been many studies made to increase data throughput provided from one BSS. For example, many studies have been made for developing a Very High Throughput (VHT) WLAN system.

The VHT WLAN system has been advanced to provide more than giga-bits of throughput by adapting a Multi-user Multiple Input and Multiple Output (MU-MIMO) technology and a multi frequency channel technology. Recently, a system using 4×4 MIMO and a channel bandwidth of more than 80 MHz has been tested to provide more than 1 Gbps throughput.

The MU-MIMO technology and the multi frequency channel technology enable one station to exchange frames with a plurality of stations through a plurality of communication paths. That is, one station can transmit data to a plurality of stations at the same time. Accordingly, the throughput of a basic service set (BSS) can be abruptly increased.

IEEE 802.11 recommends transmitting control frames to be receivable at all stations included in a corresponding BBS in order to prevent collision between frames on a wireless medium. It is even required to transmit control frames to be receivable at all stations although a plurality of communication paths are used in the MU-MIMO environment. For this, the control frame is transmitted without a MU-MIMO technology applied in a MU-MIMO environment. Further, the control frame is transmitted through a common channel commonly used by all stations in a multi frequency channel environment. Such a control frame includes a RTS frame, a CTS frame, an ACK frame, a BAR frame, a BA frame, and various Poll frames.

In case of using a plurality of communication paths, stations receiving a control frame may correspond to communication paths in one-to-one manner. Accordingly, a plurality of control frames can be transmitted through a plurality of communication paths at the same time by transmitting each control frame through a corresponding communication path. However, an overhead rate for transmitting/receiving control frames is increased and an advantage of using a plurality of communication paths is degraded.

DISCLOSURE

Technical Problem

Technical Solution

An embodiment of the present invention is directed to a method for allocating a group address (or identifier) to designate a plurality of wireless stations to one group in order to improve efficiency of using a wireless resource and enable a low power operation in a wireless local area network (WLAN) system using a MU-MIMO technology and multi frequency channels.

Another embodiment of the present invention is directed to a method for transmitting a response request frame to a plurality of wireless stations through one frame.

Still another embodiment of the present invention is directed to a method for transmitting a response frame in response to the response request frame without collision among a plurality of wireless stations.

Yet another embodiment of the present invention is directed to a method for transmitting and receiving data using the allocated group address (or Identifier).

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for allocating a group address (or identifier) to group a plurality of stations in a wireless local area network (WLAN) system, includes: transmitting a group agreement request frame to target stations to be grouped where the group agreement request frame includes the group address (or identifier); and a receiving a response frame in response to the group agreement request frame.

The group agreement request frame may include information on the group address (or identifier) and an address of a predetermined station as a destination address.

The response frame may be one of a group agreement response frame and an ACK frame for the group agreement request frame.

The response frame may be transmitted after a short inter frame space (SIFS), or a group agreement response frame may be transmitted when a right for accessing a wireless medium is obtained after each receiving station transmits an ACK frame after a short inter frame space (SIFS) after receiving the group agreement request frame.

The group agreement request frame may include an indicator denoting that a transmission frame is the group agreement request frame, information on the group address (or identifier), and addresses of target stations to be grouped.

The response frame may include a group agreement response frame in response to the group agreement request frame. The group agreement response frame may be sequentially transmitted after a predetermined time interval according to an order of addresses of target stations to be grouped, or the group agreement response frame may be sequentially transmitted according to response time information included in the group agreement request frame.

In accordance with another embodiment of the present invention, a method for transmitting a response request frame requesting a plurality of stations to respond in a wireless local area network (WLAN) system, includes: obtaining information on a plurality of stations required to receive the response request frame; generating one response request frame including a multi receiving station indicator for informing there are a plurality of receiving stations and multi receiving station information recorded with the obtained information; and transmitting the generated response request frame.

The multi receiving station indicator may be set up using a predetermined bit in frame control information or by recording a receiving station address as a predetermined address, wherein the receiving station address is a destination address.

The multi receiving station information may include multi receiving station address information corresponding to a number of receiving stations.

In accordance with still another embodiment of the present invention, a method for transmitting a response frame at a plurality of stations in response to a response request frame in a wireless local area network (WLAN) system, includes: receiving a response request frame including a multi receiving station indicator for informing there are a plurality of stations required to receive a frame and a multi receiving station information field recorded with information on a plurality of stations; and transmitting a response frame for the response request frame sequentially after a predetermined time interval according to an address order of a plurality of stations recorded in the multi receiving station information field.

The predetermined time interval may be a short inter frame space (SIFS) or a time calculated based on an own response turn, a length of the response frame, and a short inter frame space.

In accordance with yet another embodiment of the present invention, a method for transmitting a response frame in response to a response request frame at a plurality of stations in a wireless local area network (WLAN) system, includes: receiving one response request frame including a multi receiving station indicator indicating there are a plurality of stations to receive a frame and a multi receiving station information field recorded with information on a plurality of stations; and sequentially transmitting response frames in response to the response request frame according to response time information of each receiving station included in the multi receiving station information field.

In accordance with yet another embodiment of the present invention, a method for transmitting data in a wireless local area network (WLAN) system, includes: deciding a group address (or identifier) through an agreement procedure at a plurality of stations; and transmitting data by including the decided group address (or identifier) in a signal field of a transmission frame in order to enable a plurality of stations having the same group address (or identifier) to receive data.

Advantageous Effects

In an embodiment of the present invention, a group address information field is added in a typical wireless local area network (WLAN) to designate a plurality of stations to a group. Such a group address is allocated through effective agreement of wireless stations. Using such a group address, information can be transmitted to a plurality of station through one frame. When a frame received at wireless stations designated as one group is a frame requesting response, a response frame can be transmitted without collision. Accordingly, transmission efficiency can be significantly improved at a MAC end.

DESCRIPTION OF DRAWINGS

FIG. 3 is a diagram illustrating a new frame structure including a multi receiving station information field in accordance with an embodiment of the present invention.

FIG. 4 is a diagram illustrating a multi receiving station information field in accordance with an embodiment of the present invention.

FIG. 7 is a diagram illustrating a structure of multi receiving station information including response time information in accordance with an embodiment of the present invention.

BEST MODE

Figures 1, 2:
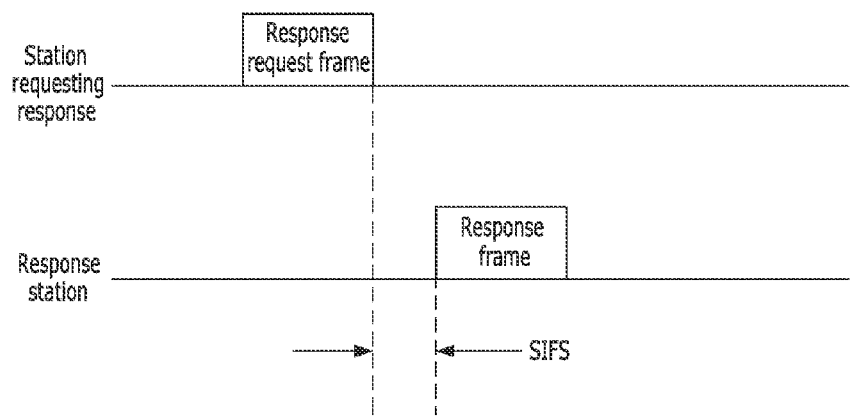
FIG. 1 is a diagram illustrating a typical wireless local area network MAC frame.
FIG. 2 is a diagram illustrating a method for transmitting a response frame in response to a response request frame based on a typical immediate method.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

Frame control information is required to be analyzed by all stations in order to detect a type of a received frame. Medium occupancy time information is required to be analyzed by all stations to prevent collision between frames on a wireless medium. The receiving station address information is required to be analyzed by all stations to determine whether a destination address of a received frame is own address or not. When the destination address of a received frame is the own address, a receiving station decodes remaining information of a received frame.

Accordingly, it is required to include an indicator (hereinafter, multi receiving station indicator). The indicator indicates that a received frame includes a plurality of receiving station addresses in one of fields that all stations can analyze. The frame also includes multi receiving station information.

FIG. 3 is a diagram illustrating a new frame structure including information on multiple receiving stations in accordance with an embodiment of the present invention.

Referring to FIG. 3, a MAC frame in accordance with an embodiment of the present invention additionally includes a multi receiving station information field with a multi receiving station indicator setup using a predetermined bit in one of a frame control information field, a receiving station address field, and a frame field added according to a WLAN protocol such as HT control information for IEEE 802.11n.

In order to set up the multi receiving station indicator, a predetermined bit of a frame control information field or predetermined receiving station address information may be used. Further, a predetermined bit in a frame field additionally added according to a WLAN protocol such as HT control information of IEEE 802.11n may be used as a multi receiving station indicator. In this case, such an additional field may be detected through frame control information.

As shown in FIG. 4, multi receiving station information includes multi receiving station number information denoting the number of stations receiving a frame and multi receiving station address information corresponding to the number of receiving stations. Accordingly, the multi receiving station information includes information on addresses of receiving stations as many as the number of multi receiving stations.

Here, the multi receiving station number information is not essential information. Accordingly, the multi receiving station number information may be not included. Further, n multi receiving station address fields may be included where n is a natural number and preferably n may be 4 (n=4). The multi receiving station address may be a MAC address or an Association identifier (ID). When the number of multi receiving stations is smaller than a predetermined natural number n, remaining fields with no multi receiving station address recorded may be recorded with meaningless data such as null or 1. When a length of a multi receiving station information is shorter than a length of a MAC address (48 bits), the multi receiving station information may be not recorded in a receiving address field of a typical Mac frame. That is, when the length of the multi receiving station information is shorter than the length of the MAC address (48 bits), the multi receiving station information may be recorded in a receiving address field of a typical MAC frame without configuring additional multi receiving station information field.

Hereinafter, a procedure of receiving a frame having multi receiving station information in accordance with an embodiment of the present invention will be described as follows.

In the procedure, a predetermined bit of a frame control information field is used as a multi receiving station indicator.

When a multi receiving station indicator is setup in frame control information, the number of multi receiving stations is determined based on multi receiving station number information included in a received frame. Then, addresses of multi receiving stations are determined according to the number of multi receiving stations. If the determined addresses of multi receiving stations include own address, it is determined that a received frame is a frame transmitted to itself. However, if the determined addresses of multi receiving stations do not include the own address, it is determined that the received frame is not a frame transmitted to itself. Further, if the multi receiving station number information is not included in the received frame, the process of determining the multi receiving station number information may be omitted.

Meanwhile, if the multi receiving station indicator is not setup in the frame control information, the multi receiving station information is not included in the received frame. Accordingly, receiving station address information is checked in the received frame. If the checked receiving station address is an own address, it is determined that the received frame is a frame transmitted to itself. If not, it is determined that the received frame is not a frame transmitted to itself.

Hereinafter, a procedure of receiving a frame having multi receiving station information when predetermined receiving station address information is used as a multi receiving station indicator in accordance with an embodiment of the present invention will be described as follows.

If receiving station address information of a received frame is a predetermined value designated as a multi receiving station indicator, the number of receiving stations is checked based on multi receiving station number information included in the received frame. Then, multi receiving station addresses are determined according to the checked number of multi receiving stations. If the multi receiving station addresses include own address, it is determined that the received frame is a frame transmitted to itself. If not, it is determined that the received frame is not a frame transmitted to itself.

Meanwhile, if the receiving station address information of the received frame is not a predetermined value designated as the multi receiving station indicator, it is determined as a general receiving station address. Accordingly, if the receiving station address information is an own address, it is determined that the received frame is a frame transmitted to itself. If not, it is determined that the received frame is not a frame transmitted to itself.

A respond method for a frame requesting immediate response when the received frame includes addresses of a plurality of receiving stations and when the multi receiving station addresses include own address will be described as follows.

In a typical method for responding to a frame requesting an immediate response, a response frame is transmitted after a short time interval such as a short inter frame space (SIFS) after receiving a frame requesting a response as described above.

However, if the typical method is used when the frame requesting an immediate response includes a plurality of receiving station addresses, a plurality of receiving stations transmit a response frame at the same time. As a result, the frames are collided. In order to overcome such a problem, a method for sequentially transmitting response frames at a plurality of stations is introduced.

Hereinafter, a method for sequentially responding at a plurality of stations in accordance with a first embodiment of the present invention will be described in reference to FIG. 5. In the first embodiment of the present invention, a plurality of stations sequentially response to a response request frame according to an order of multi receiving station addresses. In the first embodiment of the present invention, a station transmits a response frame to a response request frame at an own turn while monitoring response frames transmitted from other stations.

Stations are aware of an own turn to transmit a response frame based on an order of multi receiving station addresses. A station transmits a response frame at an own turn while monitoring other stations responding to a response request frame. An interval of response frames transmitted by a plurality of stations is a short inter frame space (SIFS). However, if there is a station not responding at own turn as a response of monitoring, a next station transmits a response frame after a PIFS which is longer than the SIFS.

Figure 6:
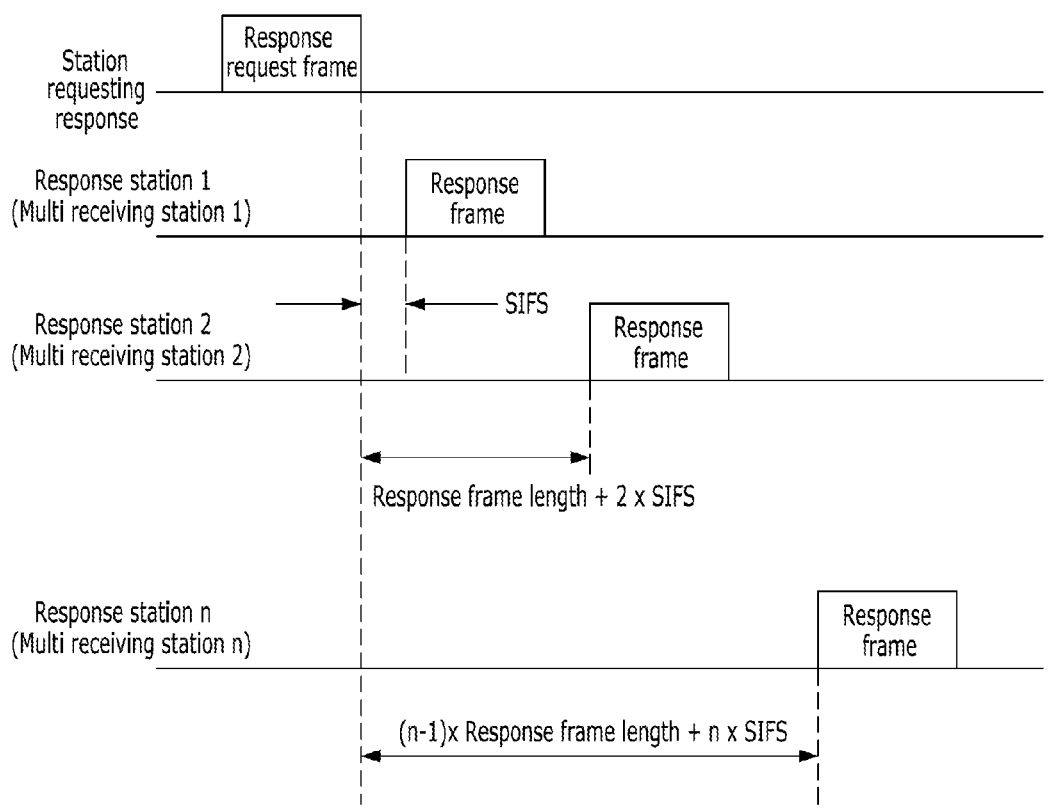
FIG. 6 is a diagram illustrating a method for responding at a plurality of stations by calculating a response time in accordance with an embodiment of the present invention.

Like the first embodiment of the present invention that transmits a response frame according to an order of multi receiving station addresses, a plurality of stations sequentially transmit a response frame in accordance with a second embodiment of the present invention. Unlike the first embodiment of the present invention, a response order and a response time are calculated based on a length of a response frame and a station transmits a response frame at the calculated response time in the second embodiment of the present invention. With reference to FIG. 6, the second embodiment of the present invention will be described.

Stations are aware of an own turn to transmit a response based on a multi receiving station address order and a length of a response frame. Based on such information, a station can calculate an own response time to transmit a response frame. Such a response time may be calculated using Eq. 1 shown below. In Eq. 1, T denotes a response time, k denotes a response order, and L denotes a length of a response frame.

$$T=(k-1)\times L+k\times \text{SIFS} \qquad \text{Eq. 1}$$

In a third embodiment of the present invention, a station requesting a response transmits a response request frame having not only multi receiving station addresses but also response time information. Accordingly, each station transmits a response frame at a corresponding response time included in the response request frame transmitted from the response requesting station.

In this case, multi receiving station information may be formed as shown in FIG. 7. Referring to FIG. 7, the multi receiving station information includes multi receiving station number information, multi receiving station addresses corresponding to the multi receiving station number information, and multi response time information corresponding to the multi receiving station address information in one-to-one relation.

Figure 8:
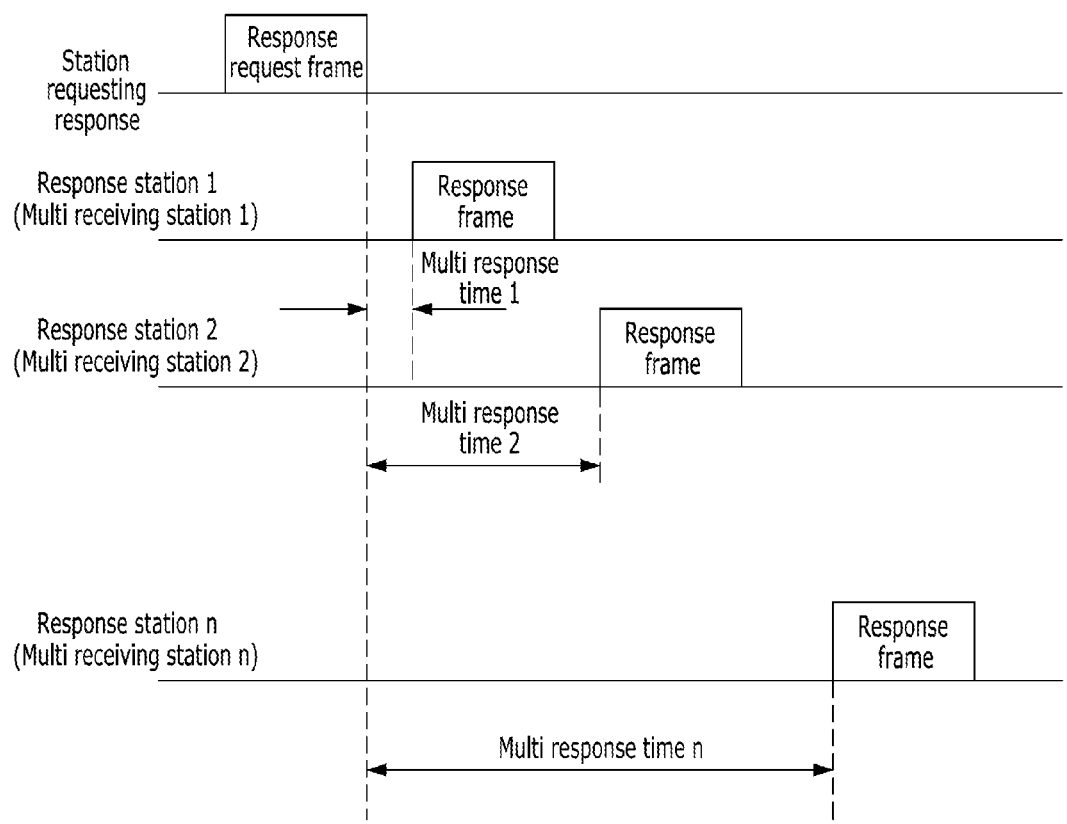
FIG. 8 is a diagram illustrating a method for responding at a plurality of stations using multi response time in accordance with an embodiment of the present invention.

FIG. 8 is a diagram illustrating a method for transmitting a response frame at a plurality of stations using a response request frame having a response time information in accordance with a third embodiment of the present invention.

Referring to FIG. 8, a station requesting response transmits multi receiving station information with multi response time information by including the multi response time information in the multi receiving station information. Accordingly, each station transmit a response frame at own multi response time. The multi response time may be a relative time or an absolute time. FIG. 8 shows the responding method based on the relative time.

Until now, a procedure of transmitting and receiving a frame at a plurality of stations by adding the multi receiving station information having a plurality of receiving station addresses in a MAC frame was described.

Hereinafter, a method for transmitting and receiving a frame using a group address (or identifier) will be described. Here, the group address (or identifier) may be a unique number, for example, a serial number such as 6-bits value allocated to be uses as a group identifier in a WLAN system, a random number allocated by a WLAN system, or a predetermined number allocated based on a predetermined rule by a WLAN system. Therefore, a group address or a group identifier denotes a unique value for identifying a group.

Such a group address (identifier) must be known to other stations in one BSS. Using a group address (identifier), all stations can detect whether a received frame is a frame transmitted to itself or not. If a received frame is not a frame transmitted to itself, a low power mode is maintained. Accordingly, power consumption may be reduced.

In order to use a group address (or identifier), it is required to have a group agreement procedure for grouping a plurality of stations into one group.

Such a group agreement procedure for grouping a plurality of stations into one group is performed when following events are occurred. At first, the group agreement procedure may be performed right before transmitting data stations in a corresponding group. Secondly, the group agreement procedure may be performed when network configuration is changed, for example, when a new station joins to a corresponding BSS. Thirdly, the group agreement procedure may be performed when the variation of a wireless channel is sensed. Fourthly, the group agreement procedure may be performed after a predetermined time passed after a corresponding group is formed. Here, the predetermined time denotes a sufficient time as long as a state of a wireless channel is changed.

In the group agreement procedure, a station requesting agreement transmits a group agreement request frame to each station in a corresponding group, and a station receiving the group agreement request frame transmits a response frame in response to the group agreement request frame.

The group agreement request frame may be transmitted by the following two methods. As a first method, after finishing responding to a group agreement request frame for one station, a group agreement request frame is transmitted to the other station. It is referred as an individual group agreement request. As a second method, after continuously receiving group agreement request frames from all stations, group agreement response frames are received. It is referred as a continuous group agreement request.

A group agreement response frame for a group agreement request may be transmitted by various methods as follows. At first, a group agreement response frame may be transmitted right after receiving a group agreement request frame. It is referred as an immediate response method. Secondly, a group agreement response frame is transmitted when a right for accessing a wireless medium is obtained after an ACK frame for a group agreement request frame is transmitted. It is referred as a delay response method. Thirdly, an ACK frame is transmitted from a group agreement request frame instead of transmitting a group agreement response frame. It is referred as a response cancel agreement request.

Figure 9:
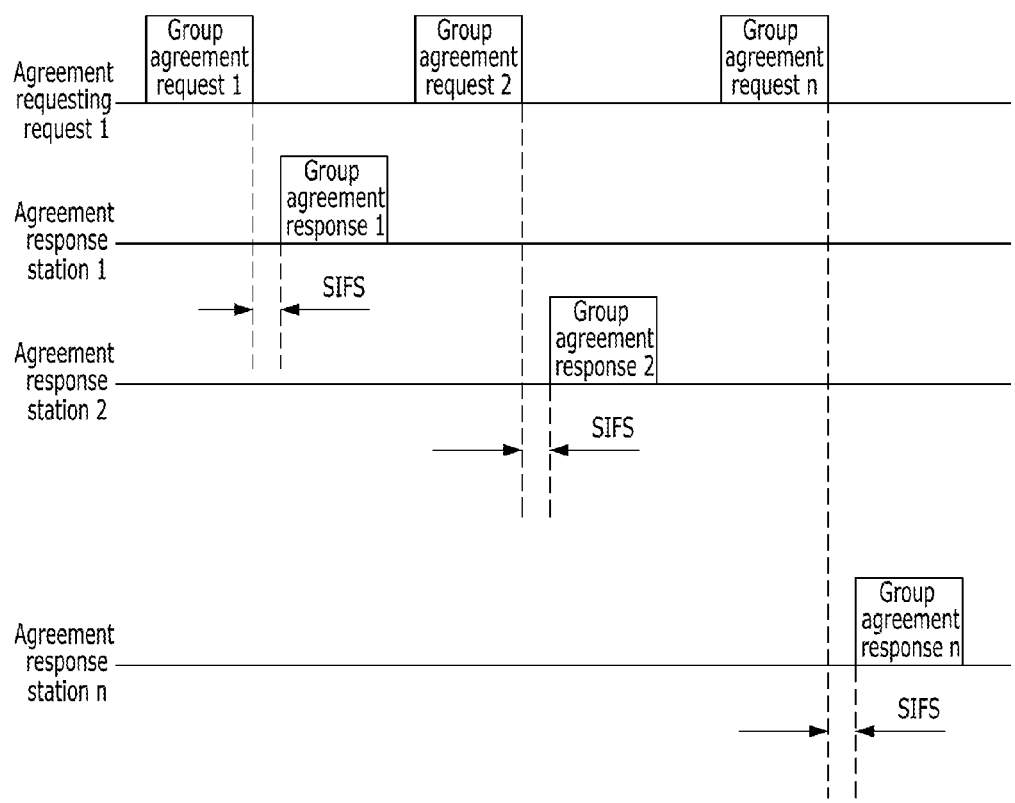
FIG. 9 is a diagram illustrating an individual group agreement request procedure based on immediate response in accordance with an embodiment of the present invention.

FIG. 9 is a diagram illustrating an individual group agreement request procedure using an immediate response method in accordance with an embodiment of the present invention.

Referring to FIG. 9, a station transmits a group agreement request frame to a first station. The first station transmits a group agreement response frame after a short inter frame space (SIFS) in response to the received group agreement request frame. Continuously, the station transmits a group agreement request frame to a second station. The second station transmits a group agreement response frame after a short inter frame space (SIFS) in response to the group agreement request frame. As described above, the station transmits the group agreement request frame individually to a plurality of stations and receives a response frame for each group agreement request frame. Here, a group agreement request frame may include address (or identifier) information used as a group address (or identifier). Further, the group agreement response frame may include information on a result to the group agreement request, such as agree or disagree.

Figure 10:
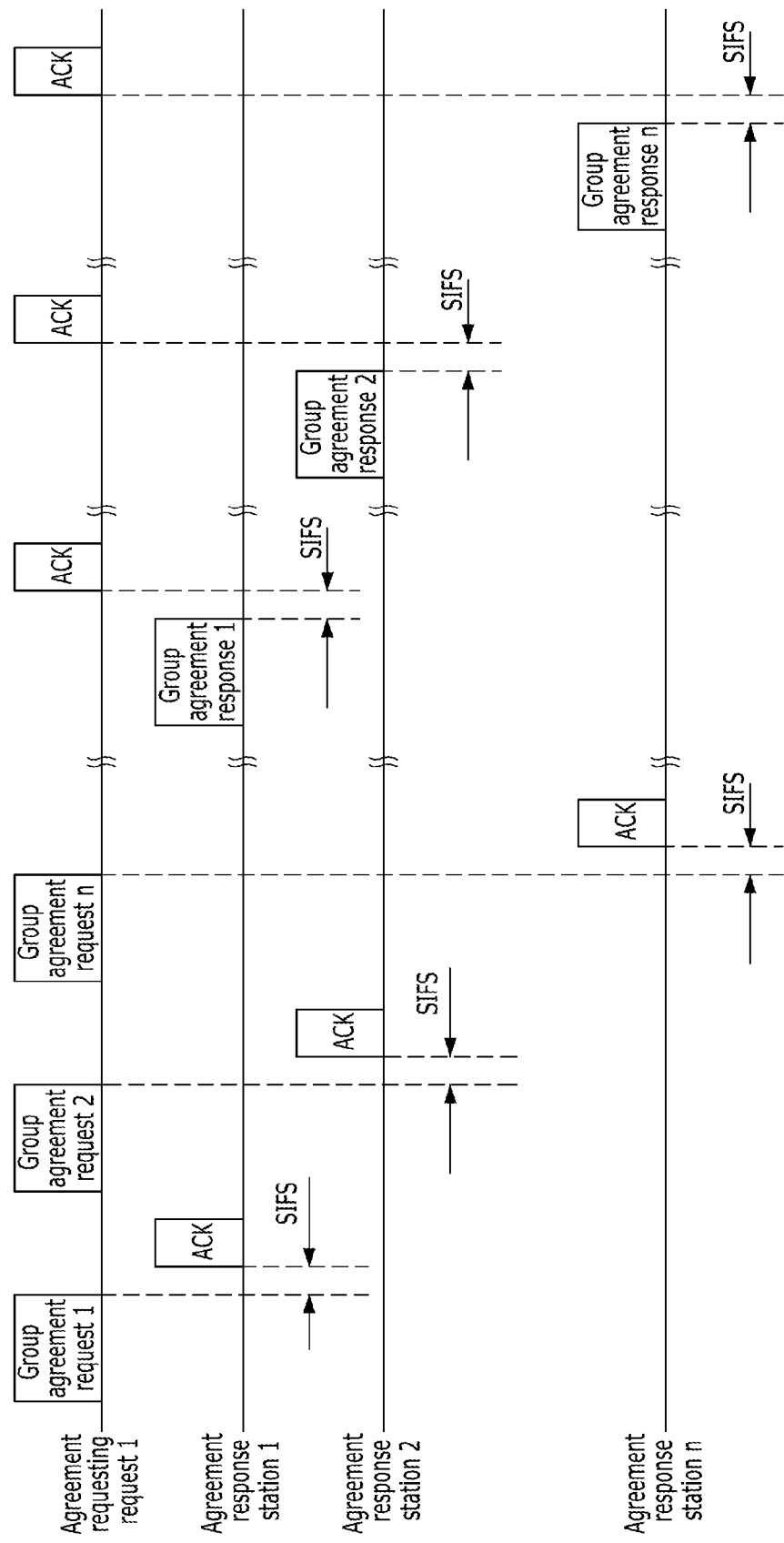
FIG. 10 is a diagram illustrating a continuous group agreement request based on delay response in accordance with an embodiment of the present invention.

FIG. 10 is a diagram illustrating a continuous group agreement request procedure using a delay response method in accordance with an embodiment of the present invention.

Referring to FIG. 10, a station transmits a group agreement request frame to a first station and receives an ACK frame from the second station after a short inter frame space (SIFS). Continuously, the station transmits a group agreement request frame to a second station which is a subject for grouping and receives an ACK frame from the second terminal after a short inter frame space (SIFS). When target stations for groping obtain a right for accessing a wireless medium after transmitting a group agreement request frame to a plurality of stations, a group agreement response frame is transmitted to the station that transmits the group agreement request frame. The station receiving the group agreement response frames from each station transmits an ACK frame to each target station for groping after a short inter frame space (SIFS).

Here, the group agreement request frame may include address (or identifier) information to be used as a group address (or identifier). Further, the group agreement response frame may include a result for a group agreement request, such as agree or disagree.

Figure 11:
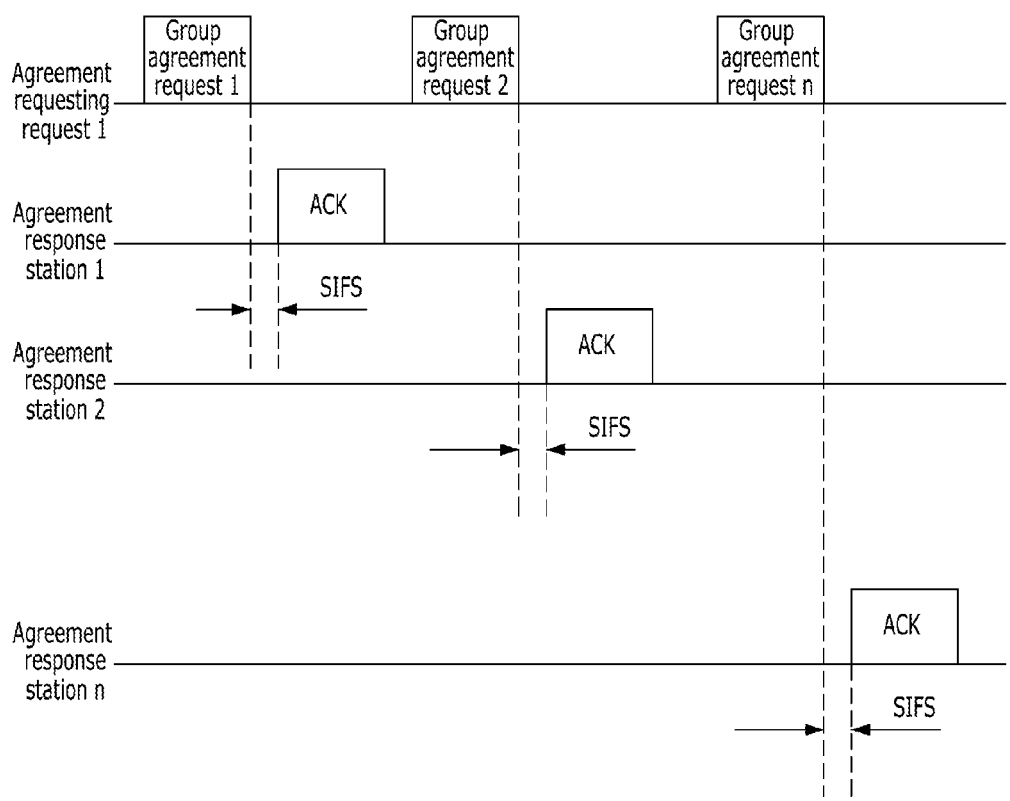
FIG. 11 is a diagram illustrating a group agreement request procedure where a response frame is canceled by immediate response in accordance with an embodiment of the present invention.

FIG. 11 is a diagram illustrating a response cancel agreement request procedure using an immediate response method in accordance with an embodiment of the present invention.

Referring to FIG. 11, a station transmits a group agreement request frame to a first station and receives an ACK frame after a SIFS. Then, the station transmits a group agreement request frame to a second station which is a target station to group and receives an ACK frame from the second station after the SIFS. It is determined that each station agrees to a group agreement request by receiving the ACK frame after transmitting the group agreement request frame to the plurality of stations.

Here, the group agreement request frame may include address (or identifier) information to be used as a group address (or identifier) and information on grouping target stations.

Figure 5:
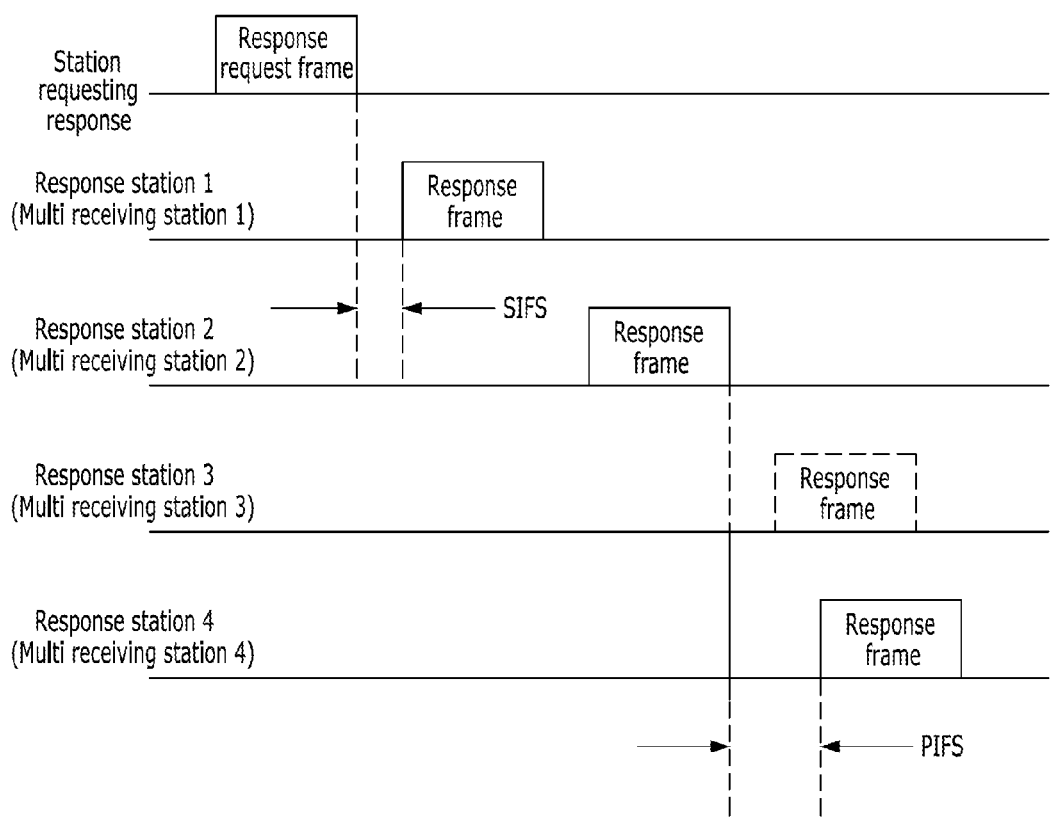
FIG. 5 is a diagram illustrating a method for responding at a plurality of stations according to an order of multi receiving station addresses in accordance with an embodiment of the present invention.

Although it was described that the group agreement request frame is transmitted individually to each station, one group agreement request frame may be transmitted to a plurality of stations using a frame structure shown in FIGS. 3 and 4 and a response frame for the group agreement request frame may be received through a method shown in FIGS. 5, 6, and 8.

In case of using one group agreement request frame, a transmitted frame includes an indicator denoting a group agreement request frame and information on addresses of grouping target stations. Further, a group agreement request frame may include information on a group address (or identifier) to be used later. Since a procedure for responding to the group agreement request frame is identical to that shown in FIGS. 5, 6, and 8, the detailed description thereof is omitted. Unlikely, the group agreement response frame may include a result such as agree or disagree to a group agreement request.

Such a group agreement procedure may be performed based on a group or based on an individual station.

In such a group based group agreement procedure, a group agreement procedure is performed for each station included in one group. Accordingly, the group based group agreement procedure is performed when a new group is formed. In this case, a group address (or identifier) to identify a corresponding group must be informed through a group agreement request frame. Further, a list of stations in a corresponding group may be informed with the group address. Here, the list of stations may be a MAC address or an association identifier (ID) which is a unique value of each station in a basic service set (BSS).

In the individual station based group agreement procedure, a group agreement procedure is performed for a plurality of groups including a target station. It is required to inform a list of group addresses (or identifiers) including a corresponding station through a group agreement request frame.

When a list of stations forming a group is changed or when a list of groups including one predetermined station is changed, a group update procedure may be used. The group update procedure may be identical to the group agreement procedure described above. Unlikely, in the group update procedure, a group update request frame is used instead of using the group agreement request frame. In case of a group based group agreement procedure, a group update request frame may includes a group address (or identifier) and a list of stations included in a update group, a list of stations added in a group, or a list of stations canceled from a group. In case of a station based group agreement procedure, a group update request frame must include a list of all group addresses (or identifiers) including a corresponding station, a list of group addresses (or identifiers) where a corresponding station is canceled from, or a list of group addresses (or identifiers) where a corresponding terminal is added.

In case of releasing a group in use, a group releasing procedure may be used. Such a group releasing procedure may be identical to the group agreement procedure. Unlikely, a group release request frame is used instead of a group agreement request frame. The group release request frame may include a group address (or identifier) to release.

After the group agreement procedure for grouping a plurality of stations into one group address (or identifier), a data frame is transmitted or received using a group address (or identifier) as follows.

A plurality of stations decides a group address (or identifier) through an agreement procedure. When a station wants to transmit data to stations in a predetermined group, the station records the decided group address (or identifier) in a signal field of a transmission frame and generates a transmission frame including unique addresses of target stations and a data payload. The station transmits the generated transmission frame.

A receiving station performs a following procedure to receive a frame. A receiving station determines that a received frame is a frame transmitted to itself when a group address (or identifier) included in the received frame is an agreed value. Then, the receiving station processes the received frame. If the group address (or identifier) included in the received frame is not an agreed value, the receiving station determines that the received frame is not a frame transmitted to itself. Accordingly, the receiving station discards the received frame.

When it is required to transmit a frame only to a predetermined station among stations included in one group, it is required to inform individual addresses of stations required to receive a corresponding frame among stations included in a corresponding group. In order to inform, addresses of stations in a group required to receive a corresponding frame may be added after a group address (or identifier). As addresses of stations in a corresponding group, a MAC address or an association ID may be used. Further, if a group agreement/update request frame used in a group agreement/update procedure includes a group address (or identifier) and a list of stations included in the corresponding group, it may indicate whether or not each station is required to receive a corresponding frame according to an order of such a list.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

[Mode for Invention]

[Industrial Applicability]

An embodiment of the present invention is applied to a technology field for allocating a group address through effective agreement at a plurality of wireless stations for designating a group in a wireless local area network (WLAN) system. Further, an embodiment of the present invention is applied to a technology field that a plurality of wireless stations designated as one group transmits a response frame without collision.

The invention claimed is:

1. A method for allocating a group address to a group of a plurality of target stations in a wireless local area network (WLAN) system, the method comprising:
   transmitting a group agreement request frame to the target stations to be grouped, the group agreement request frame including the group address that is a unique value identifying the group of the target stations; and
   receiving, from each of the target stations, a response frame corresponding to the group agreement request frame,
   wherein the group agreement request frame includes fields including the group address and station information for the target stations, and
   wherein the response frame is transmitted at a time corresponding to each of the target stations based on the fields in order to prevent collision of the response frame transmitted from each of the target stations.

2. The method of claim 1, wherein the group agreement request frame further includes an address of a predetermined station as a destination address.

3. The method of claim 1, wherein the response frame is one of a group agreement response frame and an ACK frame for the group agreement request frame.

4. The method of claim 1, wherein the response frame is transmitted after a short inter frame space (SIFS) from when each of the target stations receives the group agreement request frame.

5. The method of claim 1, wherein the response frame is a group agreement response frame corresponding to the group agreement request frame, and
   wherein the group agreement response frame is transmitted when a right to access a wireless medium is obtained after each of the target stations transmits an ACK frame, the ACK frame being transmitted by each of the target stations after a short inter frame space (SIFS) from when each of the target stations receives the group agreement request frame.

6. The method of claim 1, wherein the group agreement request frame further includes an indicator indicating that a transmission frame is the group agreement request frame, and addresses of the target stations, the indicator indicating that the group agreement request frame includes the addresses of the target stations in one of fields analyzable by the target stations.

7. The method of claim 6, wherein the response frame includes a group agreement response frame corresponding to the group agreement request frame, and wherein each of the target stations sequentially transmits the group agreement response frame after a predetermined time interval according to an order of the addresses of the target stations.

8. The method of claim 1, wherein the response frame includes a group agreement response frame corresponding to the group agreement request frame, and wherein each of the target stations sequentially transmits the group agreement response frame according to response time information included in the group agreement request frame.

9. A method for transmitting a response request frame requesting a plurality of stations to respond in a wireless local area network (WLAN) system, the method comprising:

receiving information on the plurality of stations to be grouped;

generating a single response request frame including a multi receiving station indicator indicating that the response request frame includes addresses of the plurality of stations in one of fields analyzable by the plurality of stations, and multi receiving station information recorded with the received information; and transmitting the single response request frame to the plurality of stations, wherein the single response request frame includes fields including the addresses of the plurality of stations and the multi receiving station information, and wherein a response corresponding to the single response request frame is transmitted from each of a plurality of receiving stations among the plurality of stations at a time corresponding to each of the plurality of receiving stations based on the fields in order to prevent collision of the response transmitted from the plurality of receiving stations.

10. The method of claim 9, wherein the multi receiving station indicator is set up using a predetermined bit of a frame control information field.

11. The method of claim 9, wherein the multi receiving station indicator is set up by recording a receiving station address as a predetermined address, where the receiving station address is a destination address.

12. The method of claim 9, wherein the multi receiving station information includes information on addresses of n receiving stations, where n is a natural number.

13. The method of claim 12, wherein the multi receiving station information includes a MAC address or an association ID.

14. The method of claim 12, wherein the multi receiving station information further includes multi receiving station number information that indicates the number of the of the n receiving stations.

15. The method of claim 12, wherein the multi receiving station information further includes multi response time information respectively corresponding to the addresses of the n receiving stations.

* * * * *